United States Patent
Botosan et al.

[19]

[11] Patent Number: 6,042,084
[45] Date of Patent: Mar. 28, 2000

[54] VALVE ASSEMBLY HAVING A VALVE SPRING RETAINER

[75] Inventors: Valentin Botosan, Rochester; John A. Frait, Clarkston; Michael A. Bartolino, Clinton Township; Berthold Martin, Shelby Township, all of Mich.

[73] Assignee: DaimlerChrysler Corporation, Auburn Hills, Mich.

[21] Appl. No.: 09/251,258

[22] Filed: Feb. 16, 1999

[51] Int. Cl.⁷ .................................................. F16K 51/00
[52] U.S. Cl. ............................................................ 251/337
[58] Field of Search .................................. 251/337, 324, 251/323, 321; 137/315, 316

[56] References Cited

U.S. PATENT DOCUMENTS

| | | | |
|---|---|---|---|
| 2,021,587 | 11/1935 | Agner | 251/337 |
| 3,311,341 | 3/1967 | Vironda et al. | 251/337 |
| 4,186,761 | 2/1980 | Guarnieri | 137/315 |
| 5,988,705 | 11/1999 | Norkey | 251/149.6 |

*Primary Examiner*—Kevin Shaver
*Assistant Examiner*—Eric Keasel
*Attorney, Agent, or Firm*—Kenneth H. Maclean

[57] ABSTRACT

A piston is reciprocable in a cylinder of a valve body. A spring in the cylinder has one end bearing against the piston. An abutment holds a retainer in bearing engagement with the opposite end of the spring to hold the spring under compression. The valve body has a slot through which the retainer may be introduced transversely into the cylinder when the spring is further compressed. The retainer has a locking tab. The valve body has an axial notch extending from the slot in a direction away from the spring to clear the tab when the spring is further compressed by a tool and the retainer is introduced. When the tool is withdrawn and the retainer is forced back against the abutment by the spring, the tab extends beyond the notch to be overlain and trapped or blocked by a portion of the valve body to prevent the retainer from falling out of the cylinder through the slot.

9 Claims, 2 Drawing Sheets

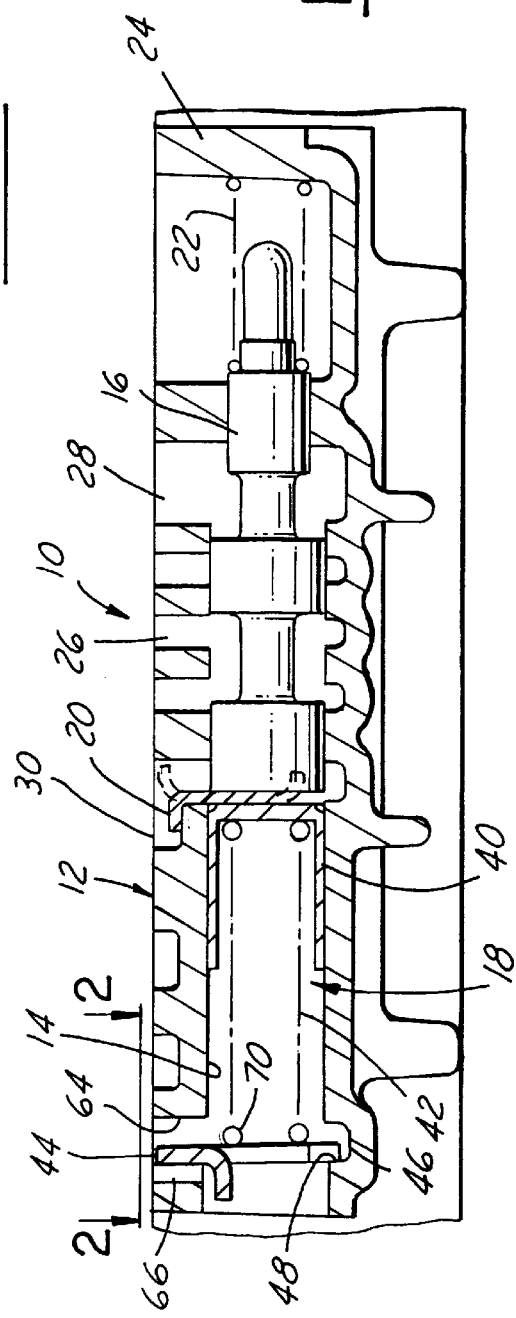
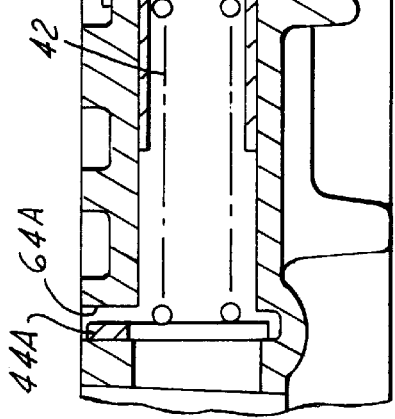
FIG. 1
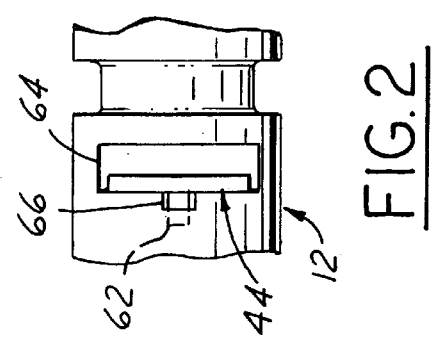
FIG. 2
FIG. 7
(PRIOR ART)

VALVE ASSEMBLY HAVING A VALVE SPRING RETAINER

This invention relates generally to valve assemblies, and more particularly to a valve assembly having a valve body, and a valve spring retainer capable of being installed through a slot in a wall of the valve body and anchored therein without risk of falling out.

BACKGROUND AND SUMMARY OF THE INVENTION

The spring retainer of this invention has many applications, but is particularly useful as part of an accumulator in a valve assembly for controlling the flow of transmission fluid to a torque converter of an automotive vehicle. Such valve assemblies typically have a valve for controlling flow from a pressure port through an outlet port to the torque converter. An accumulator is provided to absorb sudden surges or spikes in pressure. The accumulator includes a piston, a spring pressing on the piston, and a retainer for the spring. In the past, the retainer has been a simple disk-like element which is installed through a slot in a wall of the valve body. However, this simple retainer is prone to falling out through the slot especially when the pressure on the spring is reduced.

The retainer of the present invention has a locking tab. The slot in the valve body is notched so that when the spring is compressed sufficiently, as by a suitable tool, the notch will clear the tab so that the retainer can be inserted. When the tool is removed and the full pressure of the spring is applied against the retainer, the retainer is forced back against an abutment to a position in which the tab is blocked by a wall of the valve body and the retainer cannot fall out.

Preferably, the retainer is in the form of a flat, generally U-shaped plate having legs spaced apart sufficiently to receive the tool when the tool is inserted into the valve body to compress the spring. The free ends of the legs are spaced apart laterally to provide an entrance to the opening and clear the tool during lateral insertion of the retainer.

One object of this invention is to provide a valve assembly including a valve body and spring retainer having the foregoing features and capabilities.

Another object is to provide a spring retainer which is rugged and durable in use, relatively inexpensive to manufacture, easy to install, impossible to install incorrectly, and locked against falling out.

Other objects, features and advantages of the invention will become more apparent as the following description proceeds, especially when considered with the accompanying drawings and claims.

BRIEF DESCRIPTION OF THE DRAWINGS

FIG. 1 is a longitudinal sectional view of a valve assembly constructed according to this invention.

FIG. 2 is a fragmentary view taken on the line 2—2 in FIG. 1.

FIG. 7 is a longitudinal sectional view of a valve assembly constructed in accordance with the prior art.

DETAILED DESCRIPTION OF THE PREFERRED EMBODIMENT

Figure 3:
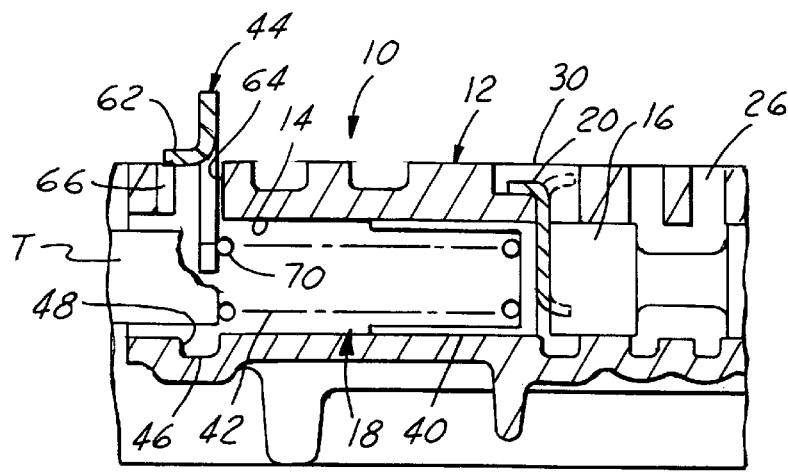
FIG. 3 is a fragmentary sectional view similar to FIG. 1, but showing the spring compressed by a tool during installation of the retainer.

Referring now more particularly to the drawings, and especially FIGS. 1–6, a valve assembly 10 includes a valve body 12 having an elongated cylinder 14 therein, an elongated spool valve 16 axially reciprocable in the cylinder 14 to control the flow of transmission fluid (oil) to a torque converter (not shown) of an automotive vehicle, and an accumulator 18.

The valve 16 is pressed axially inwardly against a plate-like stop 20 by a coil spring 22 compressed between the outer end of the valve and a wall 24 of the valve body. The valve 16 controls the flow of transmission fluid through ports 26 and 28 to or from the torque converter. Transmission fluid under pressure enters the cylinder 14 through an inlet port 30 to urge the valve 16 to the right in FIG. 1.

The accumulator 18 includes a piston 40 reciprocable axially within the cylinder 14. An axially compressible coil spring 42 presses the piston 40 against the stop 20 and is held under a predetermined compression between the piston 40 and a flat retainer 44. The stop 20 is so formed that the piston 40 is exposed to the fluid inlet port 30. Thus surges or spikes in pressure at the inlet port are absorbed by the accumulator piston. An annular groove 46 in the cylinder 14 receives the end portions of the retainer 44, with the axially inner surface 48 of the groove providing an abutment for the retainer 44.

Figure 4:
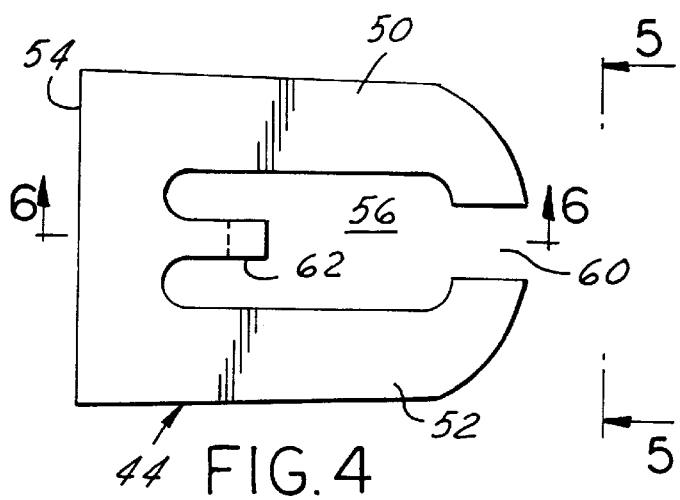
FIG. 4 is an elevational view of the retainer.
Figure 5:
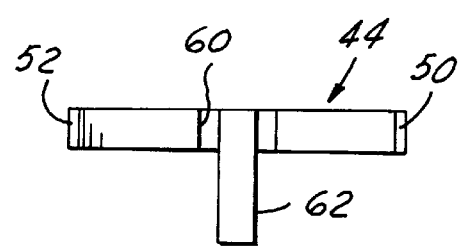
FIG. 5 is a view taken on the line 5—5 in FIG. 4.
Figure 6:
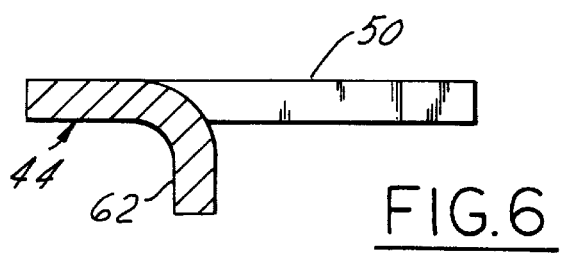
FIG. 6 is a sectional view taken on the line 6—6 in FIG. 4.

The retainer 44 is best shown in FIGS. 4–6. The retainer 44 is in the form of a flat, generally U-shaped plate of metal or any other suitable relatively rigid material and has laterally spaced apart legs 50 and 52, and a crosspiece 54 integrally connecting the legs at one end thereof. The crosspiece and legs define three sides of a central opening 56. The opposite ends of the legs are spaced apart to provide an entrance 60 to the opening.

The retainer has an integral locking tab 62 integrally connected centrally to an inner margin of the crosspiece. The tab extends into the opening 56 and then curves axially outwardly in a direction away from the spring 42.

The valve body 12 has an elongated, transverse slot 64 (FIG. 2) opening into the cylinder 14 and into the annular groove 46 in the cylinder. The slot 64 is rectangular in form, but with a notch 66 in the cylinder body extending from the slot midway between its ends in an axially outward direction, that is in a direction away from the spring 42. The notch 66 is aligned with the tab 62, and is wider than the tab, but shorter as shown in FIG. 2. The width of the slot is substantially greater than the thickness of the retainer 44 for a purpose which will become apparent from the following description.

The retainer 44 is installed in the valve body by being inserted through the slot 64 as shown in FIG. 3. To accomplish the insertion of the retainer, the spring 42 is further compressed by a tool T inserted axially into the left end of the cylinder 14 so that the end 70 of the spring clears the slot and enables the retainer to be inserted. The retainer is shown in FIG. 3 as it is being inserted and during this time it occupies a position adjacent to the right end of the slot so that the tab may pass through the notch. The tool T may be an ordinary screw driver with a narrow blade which will extend through the opening 56 in the retainer. The entrance 60 to the opening will clear the blade of the tool as the retainer is laterally inserted.

Once the retainer 44 has been fully inserted into the cylinder 14, the tool T is withdrawn whereupon the retainer is forced axially outwardly against the abutment surface 48 of the groove 46 by the force of the spring 42. This is the position of the retainer during normal operation and is shown in FIG. 1. In this position, the tab 62 extends axially beyond the notch 66 and is overlain and trapped or blocked by a portion of the valve body beyond the notch, thus locking the retainer in position and preventing it from accidentally falling out of the cylinder through the slot.

The retainer 44 cannot be inserted incorrectly, that is with its tab projecting axially away from the notch, because then the slot would not clear the tab.

FIG. 7 shows a prior art construction which is similar to the construction shown in FIGS. 1–6 except that the retainer 44A has no tab and the slot 64A has no notch. Hence there is nothing except the compression of the spring 42 to prevent the retainer from falling out of the cylinder through the slot. When this compressive force is at a minimum or is low, it is possible for the retainer to fall out.

What is claimed is:

1. In a valve assembly, a valve body having an elongated cylinder therein, a piston axially reciprocable in said cylinder, an axially compressible spring in said cylinder having a first end bearing against said piston, a spring retainer in said cylinder, an abutment in said cylinder holding said retainer in bearing engagement with a second end of said spring to maintain said spring under predetermined compression, said valve body having a slot communicating with said cylinder through which said retainer may be introduced transversely into said cylinder when said spring is held under further compression in excess of said predetermined compression, said retainer having an axially extending locking tab, said slot being shaped to clear said tab when said spring is thus held under such further compression and said retainer is introduced into said cylinder, said tab, when said spring is released from such further compression and said retainer engages said abutment, being overlain and blocked by a portion of said body to prevent said retainer from falling out of said cylinder through said slot.

2. In a valve assembly, a valve body having an elongated cylinder therein, a piston axially reciprocable in said cylinder, an axially compressible spring in said cylinder having a first end bearing against said piston, a spring retainer in said cylinder, an abutment in said cylinder holding said retainer in bearing engagement with a second end of said spring to maintain said spring under predetermined compression, said valve body having a slot communicating with said cylinder through which said retainer may be introduced transversely into said cylinder when said spring is held under further compression in excess of said predetermined compression such that said second end of said spring substantially clears said slot, said retainer having an axially extending locking tab, said valve body having an axial notch extending from said slot in a direction away from said spring to clear said tab when said spring is thus held under such further compression and said retainer is introduced into said cylinder, said tab, when said spring is released from such further compression and said retainer engages said abutment, extending axially beyond said notch to be overlain and blocked by a portion of said body to prevent said retainer from falling out of said cylinder through said slot.

3. In a valve assembly as defined in claim 2, wherein said retainer has a central opening to clear a tool inserted axially into said cylinder to hold said spring under such further compression.

4. In a valve assembly as defined in claim 3, wherein said retainer is generally U-shaped having laterally spaced apart legs which define laterally spaced apart sides of said central opening.

5. In a valve assembly as defined in claim 4, wherein said legs are connected by a transverse crosspiece, and said tab is connected to said crosspiece.

6. In a valve assembly as defined in claim 2, wherein said retainer comprises a flat, generally U-shaped plate having laterally spaced apart first and second legs, a transverse crosspiece integrally connected to a first end of the first leg and to a first end of the second leg, said crosspiece and legs defining three sides of a central opening to clear a tool inserted axially into said cylinder to hold said spring under such further compression.

7. In a valve assembly as defined in claim 6, wherein said tab is integrally connected to an inner margin of said crosspiece.

8. In a valve assembly as defined in claim 7, wherein said legs have second ends spaced apart laterally to provide an entrance to said opening.

9. In a valve assembly as defined in claim 8, wherein said piston, spring and spring retainer are parts of an accumulator for a valve for controlling the flow of transmission fluid to a torque converter.

\* \* \* \* \*